United States Patent [19]

Panella

[11] 3,887,991
[45] June 10, 1975

[54] METHOD OF ASSEMBLING A SAFETY DEVICE FOR ROCKETS

[75] Inventor: Edward A. Panella, Ridgecrest, Calif.

[73] Assignee: The United States of America as represented by the Secretary of the Navy, Washington, D.C.

[22] Filed: May 17, 1974

[21] Appl. No.: 470,892

[52] U.S. Cl. ...................... 29/450; 29/526; 60/223; 85/8.9; 220/89 B; 285/3; 403/32; 403/326
[51] Int. Cl. ............................................. B23p 11/02
[58] Field of Search ............ 29/423, 426, 526, 450; 285/3, 4, 321; 85/8.8, 8.9; 403/32, 316, 326; 60/223, 254, 255; 220/89 B, DIG. 27

[56] References Cited
UNITED STATES PATENTS

| | | | |
|---|---|---|---|
| 1,916,989 | 7/1933 | Rader | 29/526 X |
| 2,128,091 | 8/1938 | Duersen et al. | 220/89 B |
| 2,877,732 | 3/1959 | Easton | 285/321 X |
| 2,958,185 | 11/1960 | Sanders | 60/223 |
| 3,134,222 | 5/1964 | Maxson | 60/254 |
| 3,301,785 | 1/1967 | Ratliff et al. | 60/255 X |
| 3,313,113 | 4/1967 | Maxson et al. | 60/254 |
| 3,427,047 | 2/1969 | Mayo | 285/3 |
| 3,429,448 | 2/1969 | Roswell | 285/321 X |
| 3,600,895 | 8/1971 | Suter | 60/255 |
| 3,727,695 | 4/1973 | Danton | 239/288.5 X |

Primary Examiner—Charlie T. Moon
Attorney, Agent, or Firm—R. S. Sciascia; Roy Miller; Lloyd E. K. Pohl

[57] ABSTRACT

A wire is placed in an open space provided by a pair of grooves, one around the outer periphery of the closures of a rocket motor and the other one around the inner periphery of a rocket motor case and fastened together with an aluminum locking clip. If the rocket motor is subjected to an accidental external heat source of sufficient intensity, the aluminum locking clip fails and the wire springs outwardly freeing the closures from the motor case thus making the motor non-propulsive.

3 Claims, 5 Drawing Figures

3,887,991

METHOD OF ASSEMBLING A SAFETY DEVICE FOR ROCKETS

BACKGROUND OF THE INVENTION

1. Field of the Invention

This invention relates to apparatus and a method for attaching the closures of a rocket motor to the rocket motor case in a manner whereby the motor is rendered non-propulsive if subjected to an external heat source.

2. Description of the Prior Art

Fires occurring around military equipment may be of an accidental nature or caused by enemy action involving incendiary weapons and the like. Whatever the cause, it naturally follows that military personnel are extremely interested in having equipment that contributes as little as possible to the fire danger and personnel hazards attendant with a conflagration.

Loaded rocket motors stored, for example, on board a ship, are very dangerous when exposed to fires. Externally applied heat can cause them to ignite and become propulsive. Naturally, this is undesirable. Accordingly, it would be desirable to have rocket motors constructed in a manner such that they would be rendered non-propulsive if they were subjected to an external heat source of an intensity sufficient to render ignition possible. Further, if the pressure-containing capability of the case could be destroyed, the propellant would burn relativey quiescently rather than rapidly as it does at high pressure and with directed high velocity gas efflux associated with normal rocket motor operation.

SUMMARY OF THE INVENTION

According to this invention, one or both of the closures of a rocket motor is attached to the case of the motor in a way such that the closure will separate from the case if external heat of sufficient intensity is applied. The apparatus of this invention comprises a wire and an aluminum locking clip for fastening the ends of the wire together. To fasten the closure of a rocket motor to the motor case, the wire is inserted into a pair of aligned grooves, one in the motor case and the other in the closure, and the ends of the wire are clipped together with the aluminum locking clip. As long as no external heat is applied, the locking clip stays in place and the wire holds the case and closure together. If, on the other hand, external heat is applied, the aluminum locking clip fails at a predetermined temperature freeing the ends of the wire and the wire springs outwardly to a position in the space provided by the grooves where it no longer locks the case and closure together. Then, if the propellant in the motor ignites it does not propel the rocket motor but rather merely ejects the closure or closures and is consumed relatively slowly.

DESCRIPTION OF THE PREFERRED EMBODIMENT

The present invention can be conveniently described by first describing a typical prior art method for fastening an aft closure to a rocket motor case and then describing how this invention differs.

Figure 1:
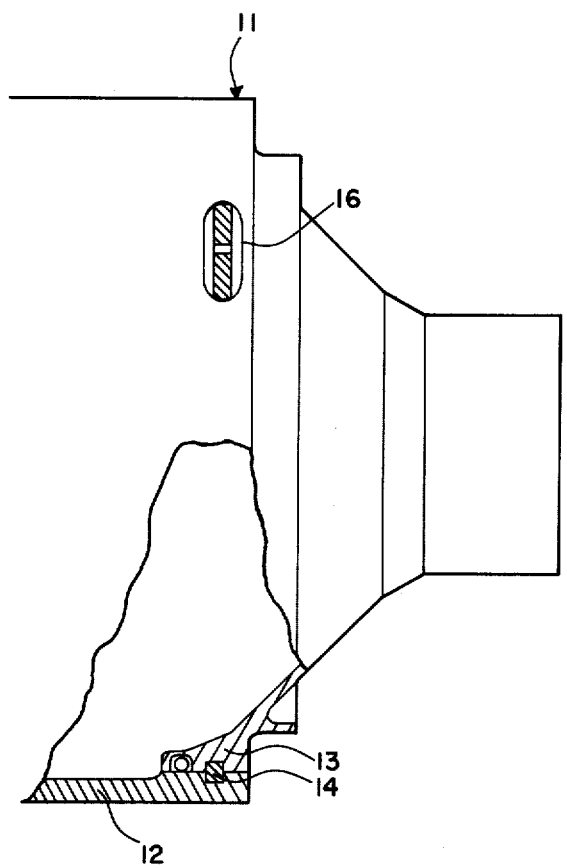
FIG. 1 is an elevational view, partially in cross section, of part of a rocket motor showing a typical prior art method for fastening the aft closure to the motor case.

FIG. 1 depicts the rear portion of a rocket motor 11. The motor has a case 12 and an aft closure 13. The aft closure contains the nozzle (not shown) and the rocket motor's propellant grain is cast in the motor case.

In FIG. 1 a wire 14 is inserted into two aligned grooves, one of which runs around the inner periphery of the motor case and the other of which runs around the outer periphery of the aft closure, to fasten the aft closure to the motor case. Entry of the wire into the grooves is made through a slotted opening 16 provided in the side of the case. As will be noted from the drawing, the wire 14 is square or nearly square in cross section and fits snugly on all sides into the space provided by the two aligned grooves.

Figure 2:
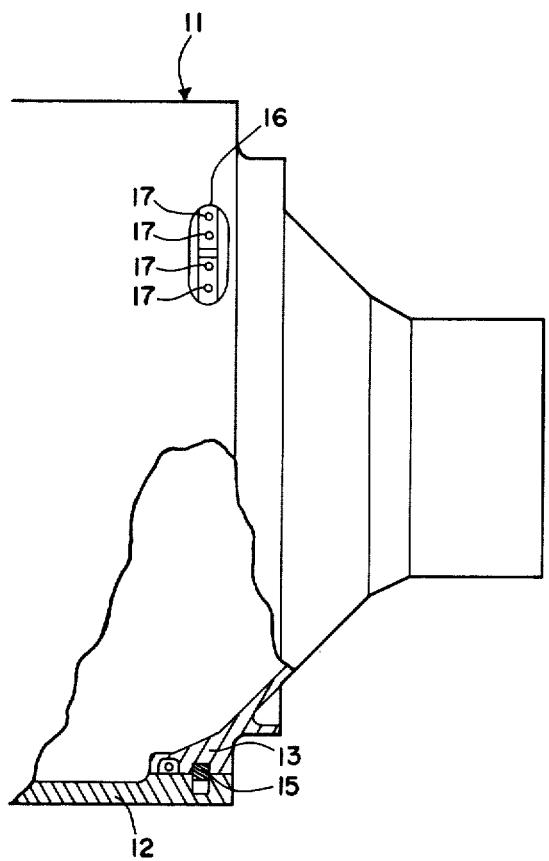
FIG. 2 is an elevational view, partially in cross section, of part of a rocket motor showing how the fastening of the aft closure to the motor case is carried out according to the present invention.

FIG. 2, like FIG. 1, depicts the rear portion of a rocket motor 11. As in the case of FIG. 1, the motor of FIG. 2 has a case 12, an aft closure 13 but the groove in the closure is deep enough to completely contain the wire. A port 16 is provided in the case 12 to permit wire 15 to be pushed into the space provided by the aligned grooves when it is desired to assembly the motor. Looking into the port, one sees the two ends of wire 15 adjacent to each other. Each end of the wire has two small holes 17 drilled into it. The reason for these holes will become apparent from reading the following disclosure.

Figure 3:
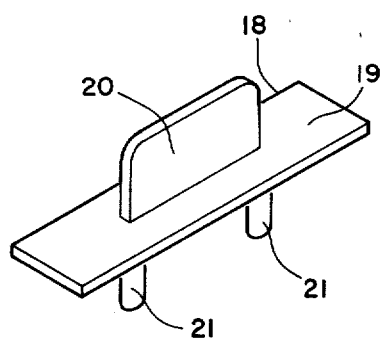
FIG. 3 is a perspective view of an aluminum fastener according to this invention.
Figure 4:
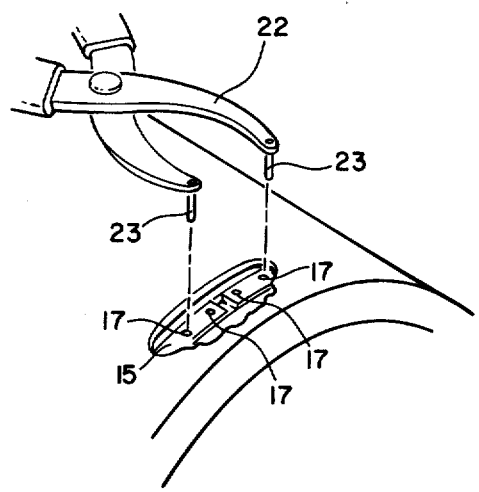
FIG. 4 is a perspective view of a portion of the motor of FIG. 2 depicting how a wire contraction tool can be used to assit in placing the locking clip of FIG. 3 in place.

FIG. 3 is a perspective view of an aluminum locking clip 18 according to this inventin. The clip has a plate-like base 19, a handle 20 and two prongs 21. To clip the two ends of wire together, one inserts one of the prongs 21 into one of the holes 17 nearest the end of the wire and inserts the other prong 21 into the hole 17 nearest the other end of the wire. To do this, a plier-like wire contraction tool 22 (see FIG. 4) can be utilized. The wire contraction tool 22 of FIG. 4 has two prongs 23 similar in size to the prongs 21 of the aluminum locking clip. These prongs 23 are inserted into the holes 17 furtherest away from the ends of wire 15 and the ends of the wire are drawn closely together. The locking slip prongs 21 can then easily be inserted into the other two holes 17 to hold the ends of the wire in place; viz. the wire is now held in the closure retaining position as seen in FIG. 2. (The locking clip is not depicted in place in FIG. 2 but it will be apparent to the reader where the locking clip fits.)

Figure 5:
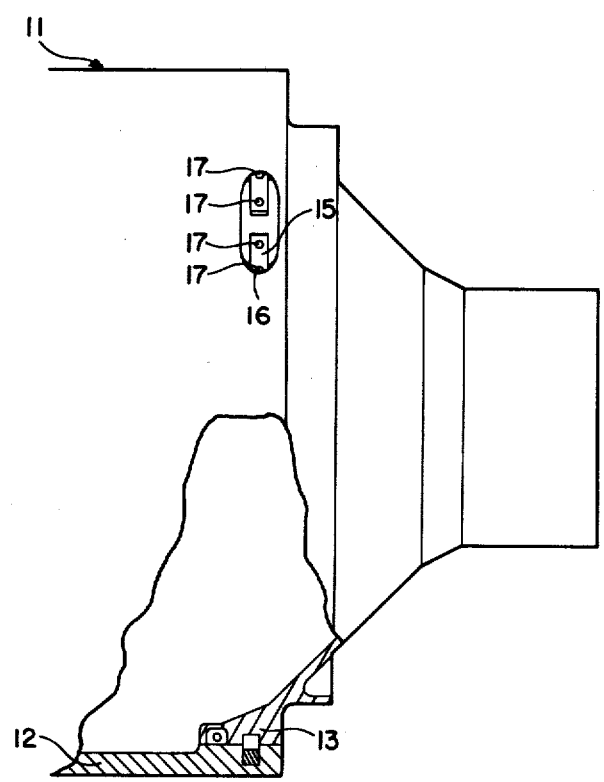
FIG. 5 is a perspective view, partially in cross section, of part of a rocket motor utilizing the fastening apparatus of FIG. 2 showing what happens when the fastening apparatus is subjected to external heat.

FIG. 5 of the drawing depicts what happens if the motor of FIG. 2 is subjected to an external heat source of sufficient intensity. If the exterior of the rocket motor is subjected to heat having an intensity sufficient to raise the temperature of the locking clip to about 400°F (aluminum loses strength rapidly when its temperature is raised above about 400°F), the locking clip will fail. When this happens, the wire 15 which is under tension, will spring outwardly into the space provided by the relatively deep groove in the motor case. Once the wire has sprung outwardly, it is no longer in position (crossing the junction of the two grooves) to hold the aft closure to the motor case. Therefore, if propellant in the case ignites, pressure exerted by exhausting gases will merely remove the aft closure from the case. Once this has occurred, the aft end of the motor case is completely open and the propellant sumply burns at a low rate because it is at low pressure.

It is preferred that the locking clip of this invention be aluminum or an aluminum alloy which fails at approximately 400°F and which has good creep strength at normal temperatures. However, it will be realized that other materials having these properties could be used. The pre-load spring tension of the lock wire is selectable by selecting the kind and degree of heat treatment for the wire.

While the several Figures of the drawing depict the fastening of an aft closure to a motor case, it will be realized that the forward closure of a rocket motor could be fastened to the motor case in the same manner.

What is claimed is:

1. A method for fastening closures and a rocket motor case together comprising the steps of:
   a. providing an externally grooved closure;
   b. providing an internally grooved cylindrical motor case;
   c. aligning the grooves;
   d. inserting a resilient wire having a cross section larger than the groove in the closure and smaller than the groove in the motor case in the aligned grooves;
   e. resiliently drawing the ends of the wire together; to move the wire into the groove in said closure, and
   f. fastening the ends of the wire together with a locking clip fabricated from a material which will retain its streenth at temperatures up to a predetermined temperature and then fail whereby the wire will spring out of the groove in the closure and into the groove in the motor case to release the closure from the motor case.

2. A method accoridng to claim 1 wherein the material of the locking clip retains its strength up to about 400°F and then fails.

3. A method according to claim 2 wherein the material of the locking clip is selected from the group consisting of aluminum and aluminum alloys which retain their strength up to about 400°F and then fail.

* * * * *